(12) United States Patent
Parker

(10) Patent No.: US 6,596,163 B1
(45) Date of Patent: Jul. 22, 2003

(54) DEVICE FOR TREATMENT OF CARBON BASED FUEL

(76) Inventor: William Russel Parker, 4216 E. Iona Rd., Idaho Falls, ID (US) 83401

(*) Notice: Subject to any disclaimer, the term of this patent is extended or adjusted under 35 U.S.C. 154(b) by 33 days.

(21) Appl. No.: 09/879,369

(22) Filed: Jun. 11, 2001

Related U.S. Application Data

(60) Provisional application No. 60/211,691, filed on Jun. 14, 2000.

(51) Int. Cl.[7] .......................... F02M 33/00; F02B 75/00
(52) U.S. Cl. ...................... 210/222; 123/538; 335/302; 335/304
(58) Field of Search ............................. 210/222, 695; 123/536, 538; 335/302, 304

(56) References Cited

U.S. PATENT DOCUMENTS

| | | | |
|---|---|---|---|
| 4,372,852 A | 2/1983 | Kovacs | |
| 4,568,901 A | 2/1986 | Adam | |
| 4,572,145 A | 2/1986 | Mitchell | |
| 5,030,344 A | * 7/1991 | Ambrose | 210/222 |
| 5,129,382 A | 7/1992 | Stamps | |
| 5,161,512 A | 11/1992 | Adam | |
| 5,271,369 A | * 12/1993 | Melendrez | 123/538 |
| 5,992,398 A | 11/1999 | Ho | |
| 6,056,872 A | 5/2000 | Glass | |
| 6,231,759 B1 | * 5/2001 | Sato | 210/695 |

* cited by examiner

Primary Examiner—David A. Reifsnyder
(74) Attorney, Agent, or Firm—Hopkins Roden Crockett Hansen & Hoopes, PLLC

(57) ABSTRACT

A magnetic device for treating carbon based fuels by exposing the fuel piping to intense magnetic fields. The south magnetic poles are placed adjacent to the pipe and the flux lines in the pipe are increased by the use of permeable steel bars adjacent to the magnets and pipe. The device includes a flux path through a permeable housing and cover. The device can be installed around existing piping or inserted in the pipe line by pipe fittings.

12 Claims, 4 Drawing Sheets

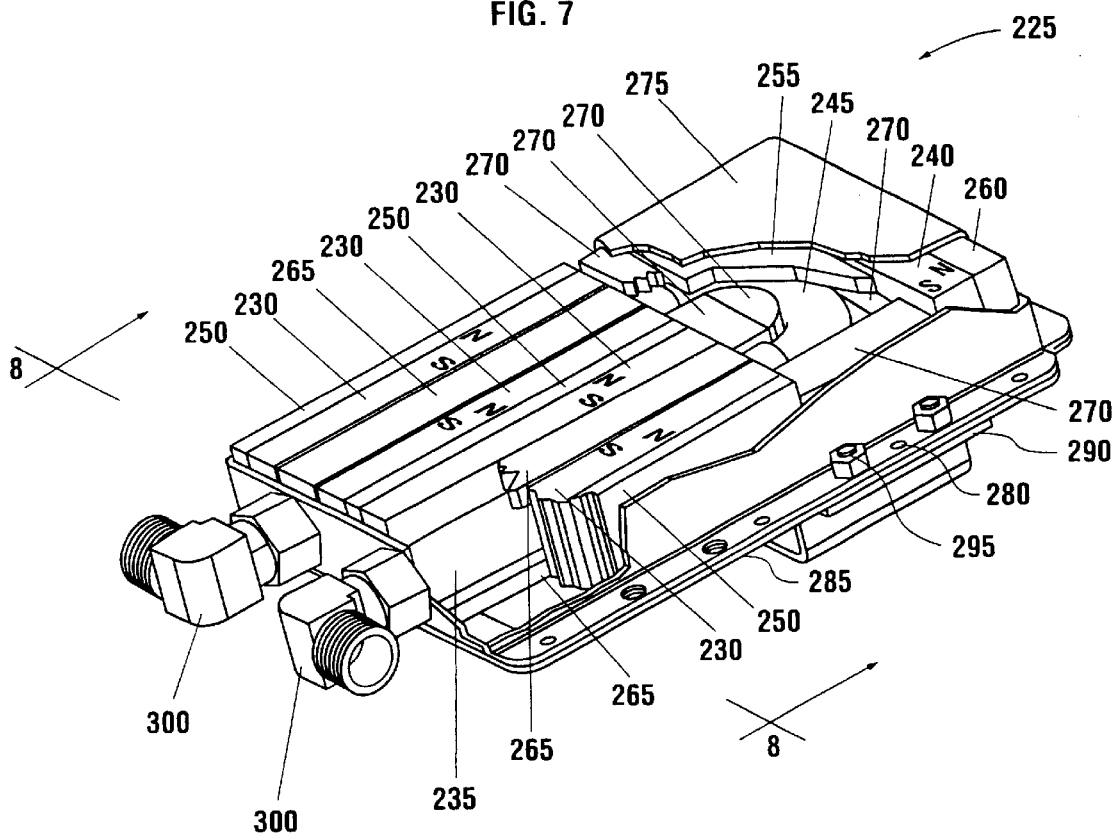
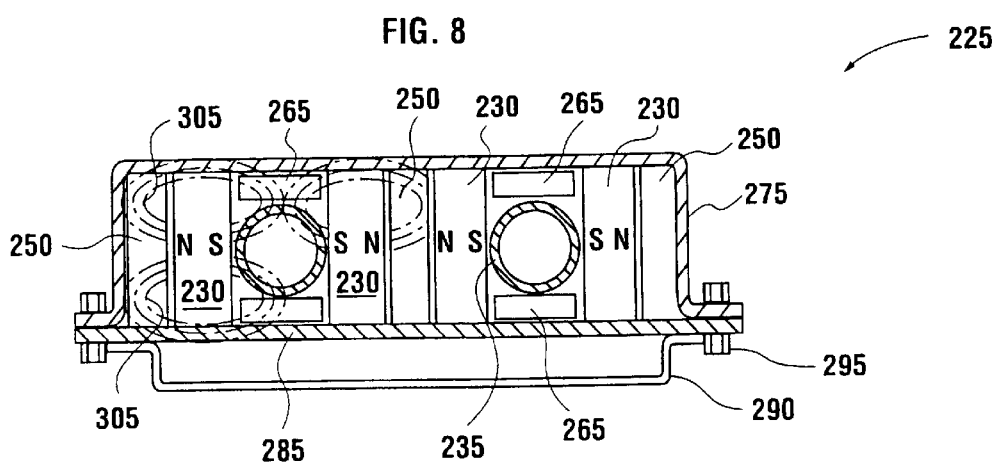

DEVICE FOR TREATMENT OF CARBON BASED FUEL

This application claims priority of Provisional Patent application No. 60/211,691 filed Jun. 14, 2000.

TECHNICAL FIELD

A device for treating carbon based fuels by magnetic treatment using opposing south pole magnets and permeable steel bars within a permeable steel housing.

BACKGROUND OF THE INVENTION

During the combustion of a typical fuel such as methane gas with oxygen, the products of the chemical reaction are carbon dioxide ($CO_2$) and water ($H_2O$). (actual equation is $CH_4 + 2 O_2 \rightarrow CO_2 + 2 H_2O$). During oxidation of methane, the hydrogen and carbon atoms are oxidized. Since carbon can occur in divalent forms (carbenes), the valance of carbon can be positive or negative due to its electron makeup of four electrons in its outer shell. The second shell of carbon needs four additional electrons to complete the shell thus it has a minus four valance. Carbon has four surplus electrons in its outer shell with a valance of positive four. The second shell requires eight electrons for completion. Carbon has a plus or minus four valance. Oxygen and hydrogen combine readily. However, the carbon-oxygen reaction is less energetic. When hydrocarbon fuel is subjected to the right magnetic field the combustion rate increases by the amount of increased carbon dioxide produced. This is due to the magnetic stimulation of the outer (valance) shell of electrons. It is difficult to combust the inner carbon atoms without magnetization. With a fuel cell the carbon will be oxidized (burned) in the engine and not the catalytic converter. Better fuel mileage and less emissions are the net result.

The fuel cell is designed to increase fuel mileage while reducing emissions. The average lifetime reduction of the hydrocarbons (HC) with the use of the fuel cell is approximately 90%. Since HC in vehicle emission represents unburned fuel, any reduction in HC will result in greater efficiency and increased mileage. It has been observed that use of the fuel cell typically results in a 15–25% increase in miles per gallon.

A reduction in the amount of carbon monoxide (CO) in vehicle emission is an indicator of more complete use of the fuel and higher combustion efficiency. Reduction of CO is should be one of our higher priorities because the air quality in our cities has been and is continuing to deteriorate. CO is one of the most predominant deadly gasses we have due to its ability to form bonds with the hemoglobin in our blood. In areas where CO is present it replaces oxygen in our blood by forming weak bonds with the hemoglobin and the blood cells die from the lack of oxygen. The process of oxygen replacement by carbon monoxide in hemoglobin creates a compound called carboxyhemoglobin. Simply put, it is a process whereby CO replaces the oxygen typically transported by the hemoglobin. This process of CO poisoning has been linked to higher death rates and respiratory ailments in high smog areas.

SUMMARY OF THE INVENTION

This method and apparatus is primarily for treating carbon based fuel to enhance the ability of the fuel to combust in a manner so that the pollutants normally found in combustion byproducts are substantially decreased and/or eliminated.

This device falls in the field of magnetochemistry. The following paragraph is taken from *Hawley's Condensed Chemical Dictionary*, $11^{th}$ *Edition* by N. Irving Sax and Richard J. Lewis, Sr., published by Van Nostrand Reinhold: Magnetochemistry—a subdivision of chemistry concerned with the effect of magnetic fields on chemical compounds; analysis and measurement of these effects, (e.g., magnetic moment and magnetic susceptibility) are important tools in crystallographic research and determination of molecular structures. Substances that are repelled by a magnetic field are diamagnetic (water, benzene); those that are attracted are paramagnetic (oxygen, transition element compounds). Diamagnetic materials have only induced magnetic moment; paramagnetic materials have permanent magnetic moment. Magnetochemistry has been useful in detection of free radicals, elucidation of molecular configurations of highly complex compounds, and in its application to catalytic and chemisorption phenomena.

Fuel treatment is done by passing the fuel through a substantially dense magnetic field, having opposing south pole magnets adjacent to the fuel pipe.

This magnetic field will also cause the fuel to be conditioned or polarized. This polarization causes the fuel and the carbon to bond with the oxygen during the combustion process. This causes a cleaner, hotter, faster fuel burn. By bonding the carbon with the oxygen, we burn all the fuel in the combustion chamber thereby utilizing all the power in the fuel and the oxygen. The net result is more power, increased manifold pressure and a lessening of hydrocarbons, carbon monoxide, oxygen and oxides of nitrogen. We normally see an increase in the carbon dioxide level. We also normally see an increase in fuel mileage and horsepower.

The cell when installed on a fuel line or into a fuel line polarizes the carbon based fuels to produce a fuel mixture that is more explosive and more efficient by causing the mixture to burn in an even and controlled environment.

Some of the benefits of the fuel cell include: increased fuel mileage, increased horsepower, removed carbon from the combustion system, freed up rings, removed carbon load, increased oil change interval, octane rating boosted, eliminated jelling of diesel fuels (lowered cloud point), reduced hydrocarbons, reduced carbon monoxide levels, reduced oxides of nitrogen, reduced post ignition pinging in gas engines, reduced ignition knock in diesel engines, lowered exhaust temperature, eliminated cold spotting and hot spotting, increased engine life, reduced carbon load in oil, improved compression, improved reseating of rings, eliminated carbon build-up in catalytic converters, and eliminated hydrogen sulfide odor from catalytic converters.

BRIEF DESCRIPTION OF THE DRAWINGS

FIG. 7 is a partial cutaway view of a fifth embodiment of a fuel saver device.

FIG. 8 is a front section view of the device taken through lines 8—8 of FIG. 7.

DETAILED DESCRIPTION OF THE INVENTION

Figure 1:
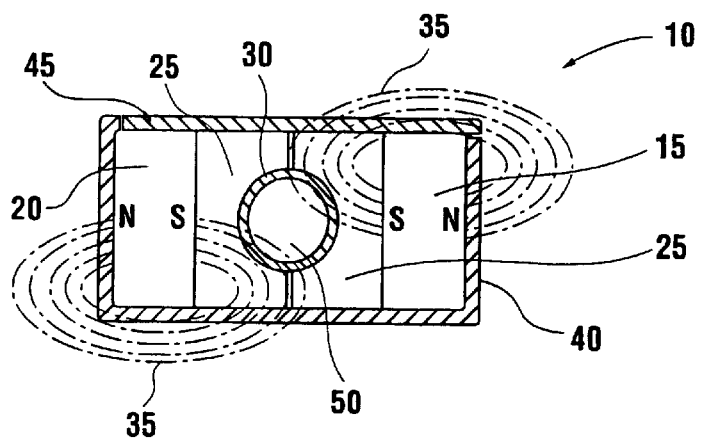
FIG. 1 is an end section view showing the magnetic flux in a fuel saver device of the present invention.

FIG. 1 illustrates the fuel saver device including magnets 15, 20, optional foam pads 25 and pipe 30 showing one-half of the magnetic field flux lines 35. The remaining flux lines from the bottom of the right magnet 15 and the top of left side magnet 20 are also symmetrical around the pipe 30 on all four sections. The flux lines are, therefore, symmetrical about both the x and y axis of the pipe 30.

The magnets 15 and 20, foam pads 25 and pipe 30 are contained within steel plate housing 40 having a base and two sides. It is covered by a steel top plate 45. Fuel 50 such as diesel or gas flows through pipe 30 and interacts with the continuous flux lines 35 prior to entering the engine (not shown). As illustrated, the magnetic south pole of each magnet 15, 20 is adjacent to the pipe 30 and insulators 25.

In this application, the top plate 45 is removable so that the parts of this device 10 can be assembled around an existing fuel pipe 30 in an operational vehicle. This type of device is designated as a "dry" assembly in that it does not require disassembly of the fuel line for installation. Conversely, a "wet" assembly would require cutting the fuel line to install a device and adding piping connections for the device inlet and outlet.

This configuration of magnets 15, 20, housing 40 and top plate 45 relative to the fluid pipe 30 strengthens the flux lines 35 through the housing 40 and top plate 45 since these items are made from permeable steel. The result is a strengthened flux field at the pipe 30. Without this continuous permeable path, the flux at pipe 30 would be significantly less. The same reduction would occur when the housing and top plate were made of non-ferrous materials, i.e., brass, plastic, etc.

Figure 2:
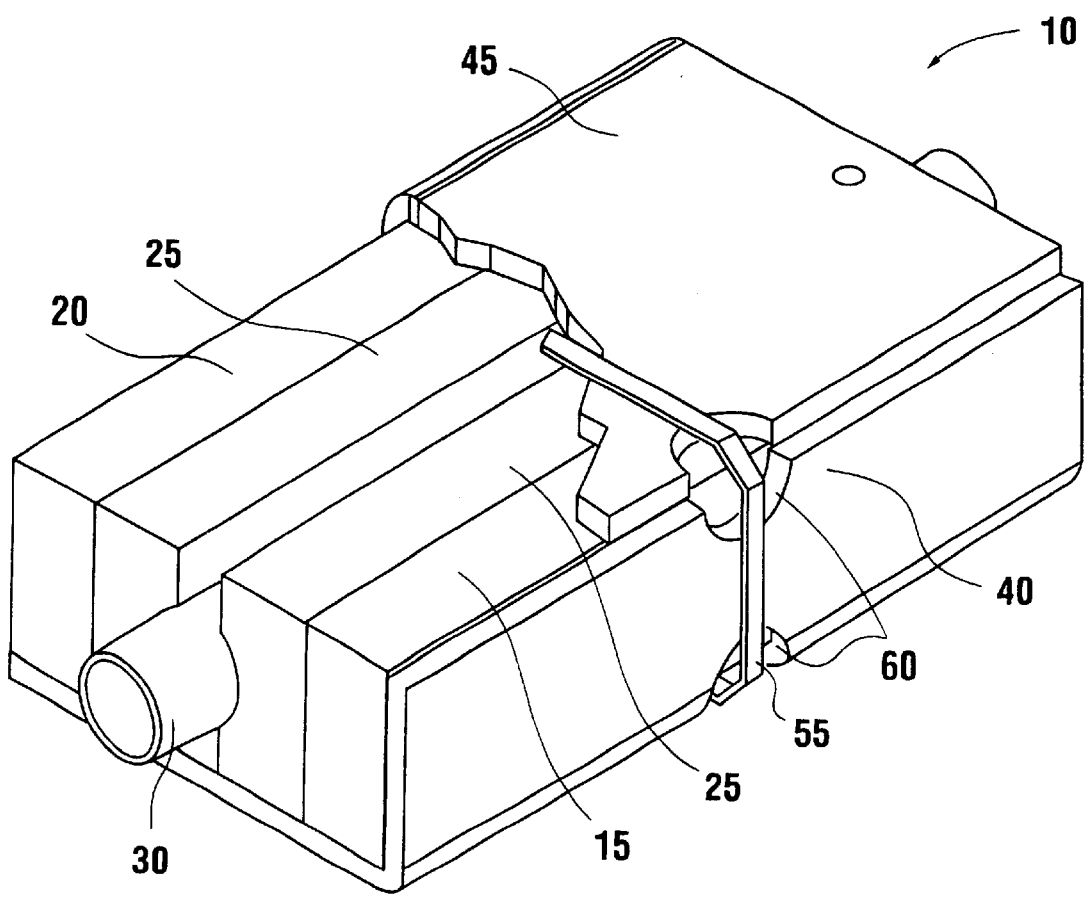
FIG. 2 is a partial cutaway perspective view of the fuel saver device of FIG. 1.

FIG. 2 illustrates a perspective partial cutaway of this device 10 utilizing 4" magnets 15, 20 and pads 25. This device 10 is strapped to pipe 30 by tie 55 which is secured in slots 60.

Figure 3:
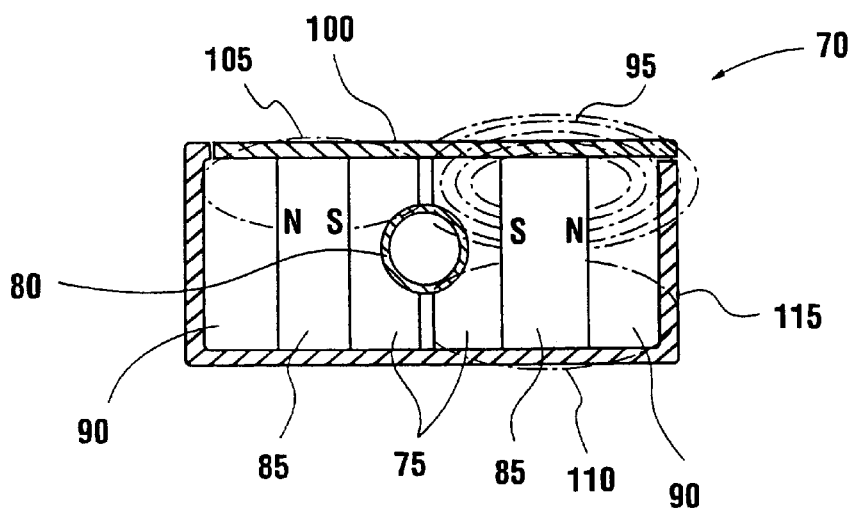
FIG. 3 is an end section view of a second embodiment of the fuel saver device using a pair of permeable field director bars.

FIG. 3 illustrates a second embodiment of the fuel saver device 10 that is designated as a high sulfur "dry" unit for fuels in foreign countries having a high sulfur content, India being one example. This device 70 also has a pair of rubber cushioning foam pads 75 on either side of fuel pipe 80. Adjacent to the pads 75 are a pair of 4" magnets 85 having their south pole adjacent to the pads 75 and pipe 80. Adjacent to the magnets 85 are a pair of 4" mild steel field directors 90. The field directors function to divert the magnetic flux lines 95 upward and into the top plate 100. In a similar configuration the flux lines 105 on the opposite side of pipe 80 would be diverted into the top plate. Similar flux lines 110 are directed downward from each magnet 85 through the field director 90 and steel housing 115. The effect of the field directors 90 is to strengthen the flux through top plate 95 and bottom of the housing 115 and, thereby, increase the flux through the fuel in pipe 80.

Figure 4:
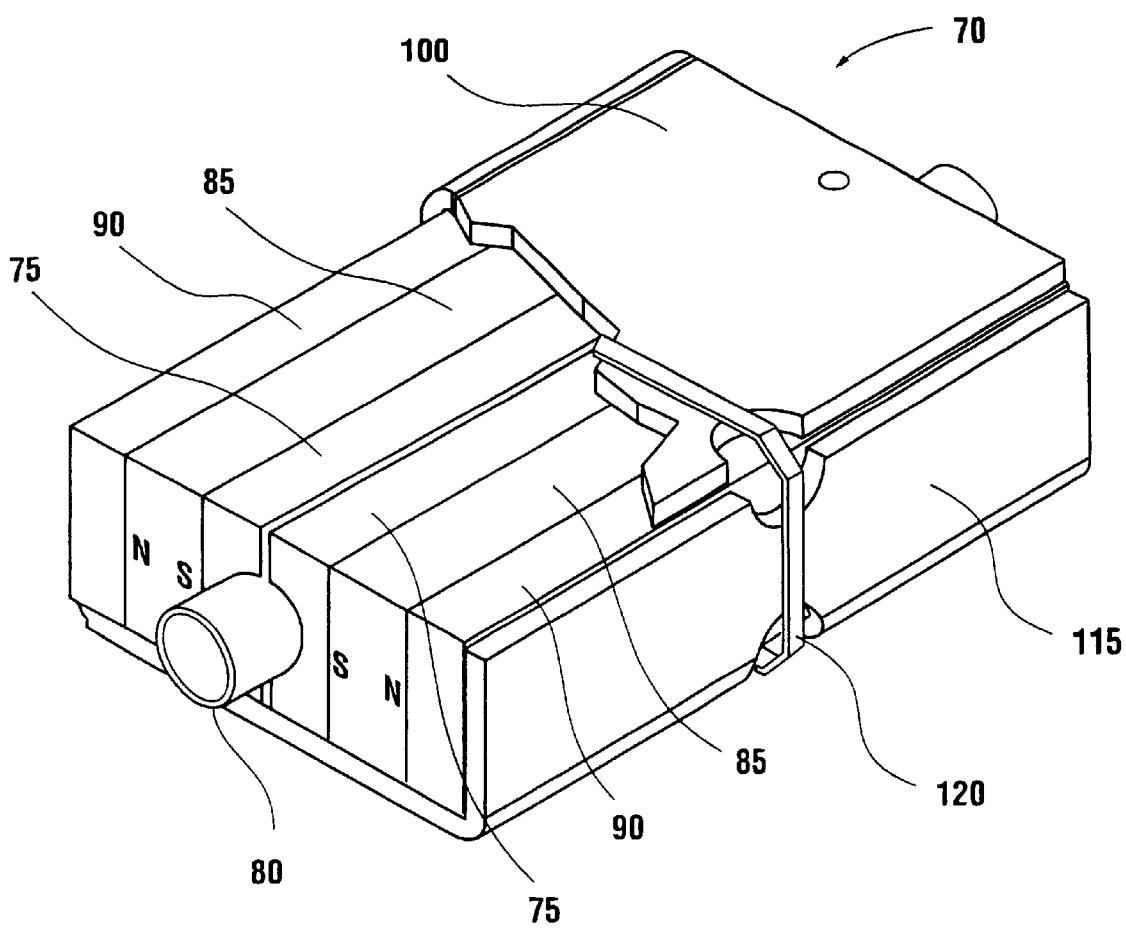
FIG. 4 is a partial cutaway perspective view of the fuel saver device of FIG. 3.

The perspective view of FIG. 4 illustrates how the device elements are clamped around pipe 80 and held in place by tie 120.

Figure 5:
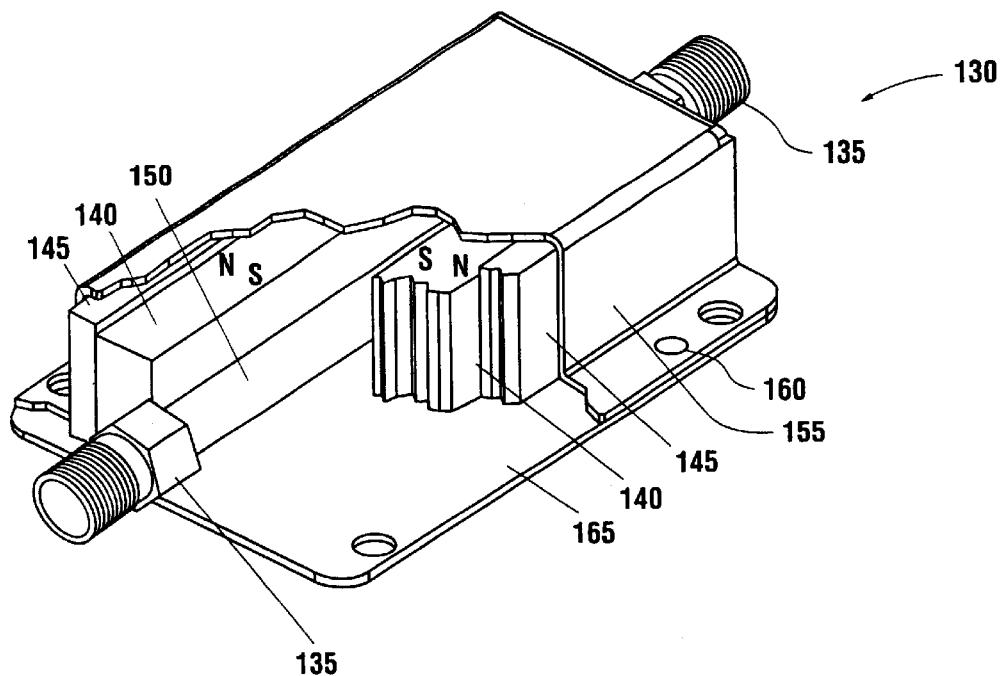
FIG. 5 is a partial cutaway perspective view of a third embodiment of a fuel saver device.

FIG. 5 illustrates a "wet" fuel device 130 requiring cutting of the fuel line and using a threaded pipe connection to attach at each ⅜" pipe connector 135. This device has a pair of 4" magnets 140 and a pair of field directors 145 in proximity to pipe 150. The fuel device has a housing 155 spot welded at 160 to bottom plate 165. The field director 145 functions as described above and as illustrated in FIG. 3.

Figure 6:
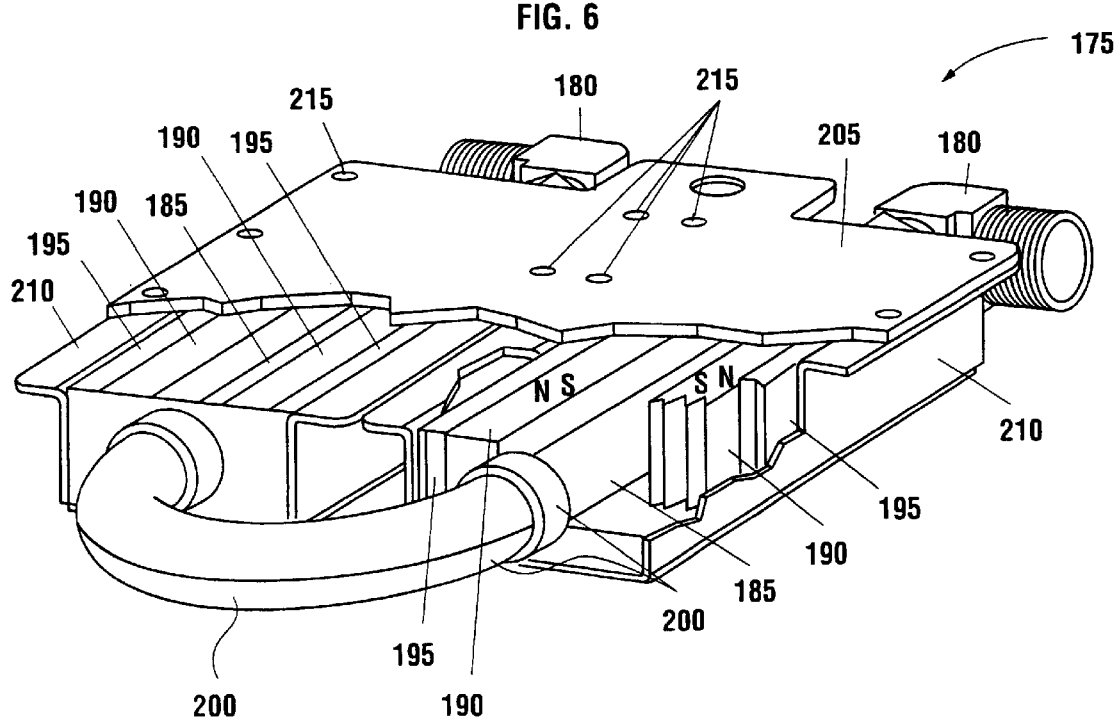
FIG. 6 is a partial cutaway view of a fourth embodiment of a fuel saver device.

FIG. 6 illustrates a U-bend "wet" fuel device 175 for use on trucks and train diesel engines. Vehicle fuel lines are connected to reducing elbow connectors 180 which direct the fuel through ½ pipe 185. This device has four 6" magnets 190 adjacent to pipe 185 and four 6" field directors 195 adjacent to the magnets 190. The field directors function as previously described for FIGS. 4 and 5. The U-bend 200 permits the use of four magnets in lieu of previous devices having two magnets. The magnetic field flux in this case is more than doubled since the magnet lengths are about 2 inches longer that the FIG. 5 device. The top plate 205 is attached to housing 210 by spot welds 215.

FIG. 7 illustrates a U-bend "wet" truck fuel saver device 225 having five 4" magnets. Four magnets 230 are adjacent to the straight pipe sections 235 and one end magnet 240 is adjacent to the U-bend 245. There are three field directors 250 in proximity to the straight pipe sections 235, and two field attractors 255 above and below the U-bend (one shown). One additional end field director 260 is in proximity to the U-bend and four field attractors 265 (three shown) are above and below the pipe section 235. The field attractors 265 serve the same function as field deflectors by directing and intensifying the magnetic field flux into the straight pipe sections and the U-bend. This device uses seven foam pads 270 (five shown) as cushioning material to retain the magnets and field directors in position.

The housing 275 is spot welded at 280 to bottom plate 285. Mounting bracket 290 is attached to the device by fasteners 295. Threaded pipe fittings 300 can connect to the vehicle fuel lines.

FIG. 8 illustrates how the flux lines 305 penetrate pipe 235 from field attractor 265 which enhances the magnetic intensity within the pipe 235. As described in the previous models, the housing 275, bottom plate 285 and field directors 250 also serve to intensify the flux into field attractors 265 and pipe 235.

The materials used are selected to provide maximum field intensities at the fuel lines. The magnets are powdered iron ceramic of grade 8 (high strength) having a strength of 750 gauss. The field directors and field attractors are mild steel AISI-SAE 4140, a chrome-molybdenum carbon steel having a permeability over 200 times that of air and other nonpermeable materials. Foam pads are 30 durometer rubber cushioning material. The housing and plates are mild steel cold-rolled and electroplated also having a permeability over 200 times that of air. The typical field strength of the magnets assembled in the housing are about 1100 gauss at the face of the south pole adjacent to the pipe.

EXPERIMENTAL FIELD TRIAL DATA

There are five sets of testing log data following showing miles/gallon improvement and significant emissions improvement for various cars and trucks. The undesirable emissions tested were: hydrocarbons (HC); carbon dioxide ($CO_2$); carbon monoxide (CO); and nitrous oxide ($No_x$). Oxygen emissions were also monitored to determine improvements in combustion.

| Parker Fuel Cell Testing Log | | | | | |
|---|---|---|---|---|---|
| Vehicle Make | GMC 6.2 Diesel | | License Plate Number | | 1J 7061 |
| Vehicle Model | 2500 | | Vehicle Owner | | K. Parker |
| Vehicle Year | 1988 | | Vehicle Driver | | K. Parker |

Step 1:
Test vehicle mileage for a minimum of
1500 miles prior to installing the Fuel Cell

| | Ending Fill-up Date | Beginning Mileage | Ending Mileage | Miles Driven | Fuel (Gallons) | Miles per Gallon | Driving Conditions (city/hwy/loaded, etc.) |
|---|---|---|---|---|---|---|---|
| 1) | 2/12/00 | 146,421 | 146,767 | 346 | 26.41 | 13.10 | Pulling 2 horse trailer w/1 horse |
| 2) | 2/20/00 | 146,767 | 147,148 | 381 | 26.83 | 14.20 | |
| 3) | 3/1/00 | 147,148 | 147,488 | 340 | 21.78 | 15.61 | |
| 4) | | | | — | | #DIV/0! | |
| 5) | | | | — | | #DIV/0! | |
| 6) | | | | — | | #DIV/0! | |
| 7) | | | | — | | #DIV/0! | |
| 3) | | | | — | | #DIV/0! | |
| 9) | | | | — | | #DIV/0! | |
| | Average | | | 1,067 | 75.02 | 14.22 | |

Step 2:
Test vehicle emissions at the same time that Step 1 is started
(attach printout from gas analyzer)

| Test Date | HC (ppm) | CO (%) | CO2 (%) | O2 (%) | NOX (ppm) | Tested By |
|---|---|---|---|---|---|---|
| 3/10/00 | 14.10 | 17.20 | 2.07 | 6.18 | 245.83 | Russ |

NOTE: Truck has original fuel pump and injectors

Step 3:
Install Fuel Cell on Vehicle

| Date Installed | 3/14/00 |
|---|---|
| Installed By | Russ |

Step 4:
Test vehicle mileage for a minimum of
1500 miles after installing the Fuel Cell

| | Ending Fill-up Date | Beginning Mileage | Ending Mileage | Miles Driven | Fuel (Gallons) | Miles per Gallon | Driving Conditions (city/hwy/loaded, etc.) |
|---|---|---|---|---|---|---|---|
| 1) | 3/16/00 | 147,488 | 147,862 | 374 | 26.34 | 14.20 | Pulling 2 horse trailer w/1 horse |
| 2) | 4/1/00 | 147,862 | 148,245 | 383 | 24.20 | 15.83 | |
| 3) | 4/19/00 | 148,245 | 148,666 | 421 | 26.15 | 16.10 | |
| 4) | | | | — | | #DIV/0! | |
| 5) | | | | — | | #DIV/0! | |
| 6) | | | | — | | #DIV/0! | |
| 7) | | | | — | | #DIV/0! | |
| 8) | | | | — | | #DIV/0! | |
| 9) | | | | — | | #DIV/0! | |
| | | | | 1,178 | 76.69 | 15.36 | |

Step 5:
Test vehicle emissions after completion of Step 4
(attach printout from gas analyzer)

| Test Date | HC (ppm) | CO (%) | CO2 (%) | O2 (%) | NOX (ppm) | Tested By |
|---|---|---|---|---|---|---|
| 4/18/00 | 3.12 | 3.07 | 3.60 | 1.70 | 120.59 | Russ |

Summary

| | Before | After | Change | % Change |
|---|---|---|---|---|
| Average Fuel Mileage | 14.22 | 15.36 | 1.14 | 8.0% |
| Emissions | | | | |
| HC (ppm) | 14.10 | 3.12 | (10.98) | −77.9% |
| CO (%) | 17.20 | 3.07 | (14.13) | −82.2% |
| CO2 (%) | 2.07 | 3.60 | 1.53 | 73.9% |
| O2 (%) | 6.18 | 1.70 | (4.48) | −72.5% |
| NOX (ppm) | 245.83 | 120.59 | (125.24) | −50.9% |

Parker Fuel Cell Testing Log

| Vehicle Make | FORD | License Plate Number | 1B 94792 |
|---|---|---|---|
| Vehicle Model | F-150 Pick-up | Vehicle Owner | Lewis Corporation |
| Vehicle Year | 1995 | Vehicle Driver | B. Myler & others |

Step 1:
Test vehicle mileage for a minimum of 1500 miles prior to installing the Fuel Cell

| | Ending Fill-up Date | Beginning Mileage | Ending Mileage | Miles Driven | Fuel (Gallons) | Miles per Gallon | Driving Conditions (city/hwy/loaded, etc.) |
|---|---|---|---|---|---|---|---|
| 1) | 2/25/00 | 89,915 | 90,313 | 398 | 29.40 | 13.54 | hwy/loaded/empty |
| 2) | 3/29/00 | 90,313 | 90,637 | 324 | 25.20 | 12.86 | hwy/pulled trailer/load-empty |
| 3) | 4/1/00 | 90,637 | 90,999 | 362 | 26.40 | 13.71 | hwy/small trailer/load-empty |
| 4) | 4/5/00 | 90,999 | 91,416 | 417 | 28.50 | 14.63 | hwy/2 loaded trailer/empty |
| 5) | 4/10/00 | 91,416 | 91,770 | 354 | 27.80 | 12.73 | normal-empty |
| 6) | 4/10/00 | 91,770 | 91,992 | 222 | 14.90 | 14.90 | normal-empty |
| 7) | 4/13/00 | 91,992 | 92,373 | 381 | 28.10 | 13.56 | loaded/trailer/hwy |
| 8) | | 92,373 | | | | #DIV/0! | |
| 9) | | | | — | | #DIV/0! | |
| | Average | | | 2,458 | 180.30 | 13.63 | |

Step 2:
Test vehicle emissions at the same time that Step 1 is started
(attach printout from gas analyzer)

| Test Date | HC (ppm) | CO (%) | CO2 (%) | O2 (%) | NOX (ppm) | Tested By |
|---|---|---|---|---|---|---|
| 4/17/00 | 198.00 | 0.62 | 9.82 | 8.01 | 14.53 | Russ |

Step 3:
Install Fuel Cell on Vehicle

| | |
|---|---|
| Date Installed | 4/17/00 |
| Installed By | Jathan |

Step 4:
Test vehicle mileage for a minimum of 1500 miles after installing the Fuel Cell

| | Ending Fill-up Date | Beginning Mileage | Ending Mileage | Miles Driven | Fuel (Gallons) | Miles per Gallon | Driving Conditions (city/hwy/loaded, etc.) |
|---|---|---|---|---|---|---|---|
| 1) | 4/24/00 | 92,631 | 92,990 | 359 | 25.50 | 14.08 | loaded/trailer/2 empty/hwy |
| 2) | 5/1/00 | 92,990 | 93,458 | 468 | 32.20 | 14.53 | loaded/trailer/2 empty/hwy |
| 3) | 5/4/00 | 93,458 | 93,802 | 344 | 26.30 | 13.08 | loaded/trailer/2 empty/hwy |
| 4) | 5/9/00 | 93,802 | 94,141 | 339 | 24.85 | 13.64 | loaded/trailer (couple empty/hwy) |
| 5) | 5/12/00 | 94,141 | 94,535 | 394 | 28.00 | 14.07 | loaded/trailers/¼ tank city/some empty |
| 6) | 5/22/00 | 95,178 | 95,521 | 343 | 23.60 | 14.53 | loaded/trailers/some empty |
| 7) | 5/23/00 | 95,521 | 95,829 | 308 | 25.82 | 11.93 | loaded/trailers/some empty |
| 8) | 5/30/00 | 95,829 | 96,301 | 472 | 31.60 | 14.94 | loaded/trailers/some empty |
| 9) | | | | — | | #DVI/01 | |
| | Average | | | 3,027 | 217.87 | 13.89 | |

Step 5:
Test vehicle emissions after completion of Step 4
(attach printout from gas analyzer)

| Test Date | HC (ppm) | CO (%) | CO2 (%) | O2 (%) | NOX (ppm) | Tested By |
|---|---|---|---|---|---|---|
| 5/5/00 | 153.00 | 0.31 | 8.23 | 8.76 | 9.31 | Jathan |

Summary

| | Before | After | Change | % Change |
|---|---|---|---|---|
| Average Fuel Mileage | 13.63 | 13.89 | 0.26 | 1.9% |
| Emissions | | | | |
| HC (ppm) | 198.00 | 153.00 | (45.00) | −22.7% |
| CO (%) | 0.62 | 0.31 | (0.31) | −50.0% |
| CO2 (%) | 9.82 | 8.23 | (1.59) | −16.2% |
| O2 (%) | 8.01 | 8.76 | 0.75 | 9.4% |
| NOX (ppm) | 14.53 | 9.31 | (5.22) | −35.9% |

Parker Fuel Cell Testing Log

| Vehicle Make | Buick | License Plate Number | 1J 232 |
|---|---|---|---|
| Vehicle Model | Century | Vehicle Owner | K. Parker |
| Vehicle Year | 1991 | Vehicle Driver | R. Parker |

Step 1:
Test vehicle mileage for a minimum of 1500 miles prior to installing the Fuel Cell

| | Ending Fill-up Date | Beginning Mileage | Ending Mileage | Miles Driven | Fuel (Gallons) | Miles per Gallon | Driving Conditions (city/hwy/loaded, etc.) |
|---|---|---|---|---|---|---|---|
| 1) | Mar. 14/00 | 198,300 | 198,672 | 372 | 15.10 | 24.64 | Between Pocatello & I. F. |
| 2) | Mar. 17/00 | 198,672 | 199,053 | 381 | 14.70 | 25.92 | same |
| 3) | Mar. 21/00 | 199,053 | 199,417 | 364 | 14.80 | 24.59 | same |
| 4) | Mar. 25/00 | 199,417 | 199,798 | 381 | 15.40 | 24.74 | same |
| 5) | | | | | — | #DIV/0! | |
| 6) | | | | | — | #DIV/0! | |
| 7) | | | | | — | #DIV/0! | |
| 8) | | | | | — | #DIV/0! | |
| 9) | | | | | — | #DIV/0! | |
| | Average | | | 1,498 | 60.00 | 24.97 | |

Step 2:
Test vehicle emissions at the same time that Step 1 is started (attach printout from gas analyzer)

| Test Date | HC (ppm) | CO (%) | CO2 (%) | O2 (%) | NOX (ppm) | Tested By |
|---|---|---|---|---|---|---|
| 3/11/00 | 281.00 | 0.58 | 13.89 | 1.19 | 20.69 | Russ Parker |

Step 3:
Install Fuel Cell on Vehicle

| Date Installed | 3/25/00 |
|---|---|
| Installed By | Russ Parker |

Step 4:
Test vehicle mileage for a minimum of 1500 miles after installing the Fuel Cell

| | Ending Fill-up Date | Beginning Mileage | Ending Mileage | Miles Driven | Fuel (Gallons) | Miles per Gallon | Driving Conditions (city/hwy/loaded, etc.) |
|---|---|---|---|---|---|---|---|
| 1) | 3/27/00 | 199,798 | 200,183 | 385 | 13.70 | 28.10 | |
| 2) | 4/1/00 | 200,183 | 200,577 | 394 | 14.10 | 27.94 | |
| 3) | 4/4/00 | 200,577 | 200,981 | 404 | 14.70 | 27.48 | |
| 4) | 4/7/00 | 200,981 | 201,423 | 442 | 15.20 | 29.08 | |
| 5) | | | | | — | #DIV/0! | |
| 6) | | | | | — | #DIV/0! | |
| 7) | | | | | — | #DIV/0! | |
| 8) | | | | | — | #DIV/0! | |
| 9) | | | | | — | #DIV/0! | |
| | Average | | | 1,625 | 57.70 | 28.16 | |

Step 5:
Test vehicle emissions after completion of Step 4 (attach printout from gas analyzer)

| Test Date | HC (ppm) | CO (%) | CO2 (%) | O2 (%) | NOX (ppm) | Tested By |
|---|---|---|---|---|---|---|
| 4/7/00 | 10.00 | — | 0.02 | 20.32 | 2.62 | Russ Parker |

Summary

| | Before | After | Change | % Change |
|---|---|---|---|---|
| Average Fuel Mileage | 24.97 | 28.16 | 3.20 | 12.8% |
| Emissions | | | | |
| HC (ppm) | 281.00 | 10.00 | (271.00) | −96.4% |
| CO (%) | 0.58 | — | (0.58) | −100.0% |
| CO2 (%) | 13.89 | 0.02 | (13.87) | −99.9% |
| O2 (%) | 1.19 | 20.32 | 19.13 | 1607.6% |
| NOX (ppm) | 20.69 | 2.62 | (18.07) | 87.3% |

Parker Fuel Cell Testing Log

| Vehicle Make | Chevrolet | | License Plate Number | 358 ACP |
| --- | --- | --- | --- | --- |
| Vehicle Model | Capi-Classic | | Vehicle Owner | Peter Plew |
| Vehicle Year | 1985 | | Vehicle Driver | Peter Plew |

Step 1:
Test vehicle mileage for a minimum of
1500 miles prior to installing the Fuel Cell

| | Ending Fill-up Date | Beginning Mileage | Ending Mileage | Miles Driven | Fuel (Gallons) | Miles per Gallon | Driving Conditions (city/hwy/loaded, etc.) |
| --- | --- | --- | --- | --- | --- | --- | --- |
| 1) | 3/31/00 | 7,153 | 7,418 | 265 | 14.60 | 13.15 | Hwy/city 50/50 |
| 2) | 4/9/00 | 7,418 | 7,718 | 300 | 17.90 | 16.76 | Hwy/city 50/50 |
| 3) | 5/1/00 | 7,718 | 7,980 | 262 | 16.00 | 16.38 | Hwy/city 50/50 |
| 4) | | | | — | | #DIV/0! | |
| 5) | | | | — | | #DIV/0! | |
| 6) | | | | — | | #DIV/0! | Used Texaco-Power Plus on all fillups |
| 7) | | | | — | | #DIV/0! | |
| 8) | | | | — | | #DIV/0! | |
| 9) | | | | — | | #DIV/0! | |
| | Average | | | 827 | 48.50 | 17.05 | |

Step 2:
Test vehicle emissions at the same time that Step 1 is started
(attach printout from gas analyzer)

| Test Date | HC (ppm) | CO (%) | CO2 (%) | O2 (%) | NOX (ppm) | Tested By |
| --- | --- | --- | --- | --- | --- | --- |
| 3/31/00 | 86.00 | | 10.38 | 6.04 | 61.93 | Jathan |

Step 3:
Install Fuel Cell on Vehicle

| Date Installed | 5/3/00 |
| --- | --- |
| Installed By | Jathan |

Step 4:
Test vehicle mileage for a minimum of
1500 miles after installing the Fuel Cell

| | Ending Fill-up Date | Beginning Mileage | Ending Mileage | Miles Driven | Fuel (Gallons) | Miles per Gallon | Driving Conditions (city/hwy/loaded, etc.) |
| --- | --- | --- | --- | --- | --- | --- | --- |
| 1) | 5/9/00 | 7,980 | 8,222 | 242 | 15.03 | 16.10 | |
| 2) | 5/18/00 | 8,222 | 8,504 | 282 | 16.30 | 17.30 | |
| 3) | 5/28/00 | 8,504 | 8,826 | 322 | 17.80 | 18.09 | |
| 4) | 6/3/00 | 8,826 | 9,017 | 191 | 11.60 | 16.47 | |
| 5) | | | | — | | #DIV/0! | |
| 6) | | | | — | | #DIV/0! | |
| 7) | | | | — | | #DIV/0! | |
| 8) | | | | — | | #DIV/0! | |
| 9) | | | | — | | #DIV/0! | |
| | Average | | | 1,037 | 60.73 | 17.08 | |

Step 5:
Test vehicle emissions after completion of Step 4
(attach printout from gas analyzer)

| Test Date | HC (ppm) | CO (%) | CO2 (%) | O2 (%) | NOX (ppm) | Tested By |
| --- | --- | --- | --- | --- | --- | --- |
| 6/5/00 | 50.00 | — | 11.22 | 4.99 | 41.35 | Jathan |

Summary

| | Before | After | Change | % Change |
| --- | --- | --- | --- | --- |
| Average Fuel Mileage | 17.05 | 17.08 | 0.02 | 0.1% |
| Emissions | | | | |
| HC (ppm) | 86.00 | 50.00 | (36.00) | −41.9% |
| CO (%) | — | — | — | #DIV/0! |
| CO2 (%) | 10.38 | 11.22 | 0.84 | 8.1% |
| O2 (%) | 6.04 | 4.99 | (1.05) | −17.4% |
| NOX (ppm) | 61.93 | 41.35 | (20.58) | −33.2% |

Parker Fuel Cell Testing Log

| Vehicle Make | Chevrolet | License Plate Number | 743 ACE |
|---|---|---|---|
| Vehicle Model | 1500 Pickup | Vehicle Owner | Kim Kvamme |
| Vehicle Year | 1997 | Vehicle Driver | Kim Kvamme |

Step 1:
Test vehicle mileage for a minimum of 1500 miles prior to installing the Fuel Cell

| | Ending Fill-up Date | Beginning Mileage | Ending Mileage | Miles Driven | Fuel (Gallons) | Miles per Gallon | Driving Conditions (city/hwy/loaded, etc.) |
|---|---|---|---|---|---|---|---|
| 1) | 2/27/00 | | | 280 | 17.95 | 15.60 | City, Pocatello 2 trips |
| 2) | 2/1/00 | | | 294 | 18.26 | 16.10 | City, Pocatello 3 trips |
| 3) | 3/4/00 | | 75,418 | 262 | 16.36 | 16.01 | City, Pocatello 2 trips |
| 4) | | | | — | | #DIV/0! | |
| 5) | | | | — | | #DIV/0! | |
| 6) | | | | — | | #DIV/0! | |
| 7) | | | | — | | #DIV/0! | |
| 8) | | | | — | | #DIV/0! | |
| 9) | | | | — | | #DIV/0! | |
| | Average | | | 836 | 52.57 | 15.90 | |

Step 2:
Test vehicle emissions at the same time that Step 1 is started
(attach printout from gas analyzer)

| Test Date | HC (ppm) | CO (%) | CO2 (%) | O2 (%) | NOX (ppm) | Tested By |
|---|---|---|---|---|---|---|
| 3/10/00 | 291.00 | 0.42 | 14.10 | 1.17 | 83.71 | Russ Parker |

Step 3:
Install Fuel Cell on Vehicle

| Date Installed | 3/10/00 |
|---|---|
| Installed By | Russ Parker |

Step 4:
Test vehicle mileage for a minimum of 1500 miles after installing the Fuel Cell

| | Ending Fill-up Date | Beginning Mileage | Ending Mileage | Miles Driven | Fuel (Gallons) | Miles per Gallon | Driving Conditions (city/hwy/loaded, etc.) |
|---|---|---|---|---|---|---|---|
| 1) | 3/12/00 | 75,418 | 75,715 | 297 | 15.75 | 18.86 | Boise, horse trailer and back loaded |
| 2) | 3/12/00 | 75,715 | 76,031 | 316 | 18.59 | 17.00 | |
| 3) | 3/18/00 | 76,031 | 76.319 | 288 | 15.01 | 19.19 | City, Pocatello 1 trip |
| 4) | | | | — | | #DIV/0! | |
| 5) | | | | — | | #DIV/0! | |
| 6) | | | | — | | #DIV/0! | |
| 7) | | | | — | | #DIV/0! | |
| 8) | | | | — | | #DIV/0! | |
| 9) | | | | — | | #DIV/0! | |
| | Average | | | 901 | 49.35 | 18.26 | |

Step 5:
Test vehicle emissions after completion of Step 4
(attach printout from gas analyzer)

| Test Date | HC (ppm) | CO (%) | CO2 (%) | O2 (%) | NOX (ppm) | Tested By |
|---|---|---|---|---|---|---|
| 3/18/00 | 36.00 | 0.01 | 14.72 | 0.29 | — | Russ Parker |

Summary

| | Before | After | Change | % Change |
|---|---|---|---|---|
| Average Fuel Mileage | 15.90 | 18.26 | 2.35 | 14.8% |
| Emissions | | | | |
| HC (ppm) | 291.00 | 36.00 | (255.00) | −87.6% |
| CO (%) | 0.42 | 0.01 | (0.41) | −97.6% |
| CO2 (%) | 14.10 | 14.72 | 0.62 | 4.4% |
| O2 (%) | 1.17 | 0.29 | (0.88) | −75.2% |
| NOX (ppm) | 83.71 | — | (83.71) | −100.0% |

What is claimed is:

1. A magnetic device for treatment of carbon based fuels within a piping system, the device comprising:
   a) a permeable metal housing having two sides and a bottom;
   b) a removable, permeable, metal top plate;
   c) an optional pair of foam pads within the housing adjacent to a pipe in the piping system; and
   d) a pair of magnets within the housing adjacent to the optional foam pads or the pipe, the magnets oriented to have a south pole in proximity to the pipe;
   wherein a configuration of the magnets, housing and top plate form a continuous permeable path to the pipe thereby enhancing a magnetic flux within the pipe.

2. A magnetic device for treatment of carbon based fuels flowing within a piping system, the device comprising:
   a) a permeable metal housing having two sides and a bottom;
   b) a removable, permeable, metal top plate;
   c) a pair of permeable field directors within the housing adjacent to the housing sides; and
   d) a pair of magnets within the housing adjacent to a piping system pipe, the magnets oriented to have a south pole in proximity to the pipe;
   wherein a configuration of the magnets, field directors, housing and top plate form a continuous permeable path to the pipe thereby enhancing a magnetic flux within the pipe.

3. A magnetic device for treatment of carbon based fuels flowing within a piping system, the device comprising:
   a) a permeable metal housing having four sides and a top;
   b) a removable, permeable, metal bottom plate;
   c) a pair of permeable field directors within the housing adjacent to two opposing housing sides;
   d) A pipe section centered in the housing having a pipe connection at each end; and
   e) a pair of magnets within the housing adjacent to the pipe section, the magnets oriented to have a south pole in proximity to the pipe section;
   wherein a configuration of the magnets, field directors, housing and bottom plate form a continuous permeable path to the pipe thereby enhancing a magnetic flux within the pipe section.

4. A magnetic device for treatment of carbon based fuels flowing within a piping system, the device comprising:
   a) a permeable metal housing having four sides and a bottom;
   b) a permeable metal top plate;
   c) a U-bend pipe centered within the housing, the U-bend pipe having two straight pipe sections;
   d) two pairs of magnets within the housing each pair adjacent to one straight pipe section, the magnets oriented to have a south pole in proximity to the pipe section; and
   e) two pairs of permeable field directors, each pair located on opposite sides of the straight pipe section and adjacent to each one pair of magnets,
   wherein a configuration of the magnets, field directors, housing and top plate form a continuous permeable path to each pipe section thereby enhancing a magnetic flux within each pipe section.

5. A magnetic device for treatment of carbon based fuels flowing within a piping system, the device comprising:
   a) a permeable metal housing having four sides and a top;
   b) a permeable metal bottom plate;
   c) a U-bend pipe centered within the housing, the U-bend pipe having two straight pipe sections;
   d) two pairs of magnets within the housing each pair adjacent to one of the straight pipe sections, the magnets oriented to have a south pole in proximity to the pipe section;
   e) three permeable field adapters, the first centered between the straight pipe section and the second and third adapters adjacent to opposite sides of the housing in proximity to the straight pipe sections; and
   f) two pairs of permeable field attractors placed above and below each straight pipe section,
   wherein a configuration of the magnets, field attractors, field directors, housing and bottom plate form a continuous permeable path to each pipe section thereby enhancing a magnetic flux within each pipe section.

6. The magnetic device of claims 1, 2, 3, 4 or 5 wherein the permeable metal housing and metal top or bottom plate are made from permeable electroplated cold-rolled steel.

7. The magnetic device of claims 1 or 2 wherein the housing, pads and magnets can be assembled over an existing vehicle fuel pipe.

8. The magnetic device of claims 1, 2, 3, 4 or 5 wherein the field directors and field attractors are made from a chrome molybdenum steel.

9. The magnetic device of claims 1, 2, 3 or 5 wherein the magnet dimensions are about 1" height and 4" length.

10. The magnetic device of claim 4 wherein the magnet dimensions are about 1" height and 6" length.

11. The magnetic device of claims 1, 2, 3, 4 or 5 wherein the magnet strength in air is about 750 gauss.

12. The magnetic device of claim 5 further comprising:
    a) a pair of field attractors above and below the U-bend;
    b) a single magnet adjacent to the end of the U-bend; and
    c) a single field director adjacent to the single magnet adjacent to the end of the U-bend.

* * * * *